United States Patent [19]

Law et al.

[11] Patent Number: 5,108,045

[45] Date of Patent: Apr. 28, 1992

[54] ENGINE MOUNTING ASSEMBLY

[76] Inventors: Thomas R. Law, 12140 Angling Rd., Edinboro, Pa. 16412; Warren E. Schmidt, 616 Rondeau Dr., Erie, Pa. 16505; Randall S. Wayland, 9104 Middle Rd., Lake City, Pa. 16423

[21] Appl. No.: 514,071

[22] Filed: Apr. 25, 1990

[51] Int. Cl.⁵ .................................. B64D 27/26
[52] U.S. Cl. .................................. 241/54; 248/557
[58] Field of Search ............... 244/54; 248/556, 557, 248/560, 582, 605, 607, 608-612, 634

[56] References Cited

U.S. PATENT DOCUMENTS

| | | | |
|---|---|---|---|
| 2,197,081 | 4/1940 | Piron | 248/612 |
| 3,168,270 | 2/1965 | Bhgard et al. | 244/54 |
| 3,288,404 | 11/1966 | Schmidt et al. | 244/54 |
| 3,747,879 | 7/1973 | Houk | 248/609 |
| 4,603,822 | 8/1986 | Chee | 244/54 |
| 4,634,081 | 1/1985 | Chee | 244/54 |
| 4,717,094 | 1/1988 | Chee | 244/54 |
| 4,725,019 | 2/1988 | White | 244/54 |
| 4,805,851 | 2/1989 | Herbst | 244/54 |
| 4,976,412 | 12/1990 | Simon et al. | 248/534 |

Primary Examiner—Galen Barefoot
Attorney, Agent, or Firm—Howson and Howson

[57] ABSTRACT

A vibration isolating mount for connecting spaced structures and limiting noise transmission between the connected structures, such as between an aircraft and a turbine engine. The isolator comprises a pair of arms which are interconnected at one location by a torque tube pivotally connected to the aircraft structure and which are interconnected at another location by a tie brace which is also connected to the aircraft structure by a vibration isolator pad. The engine is connected to the arms by a hanger. The mount accepts various engine leads and reactions while minimizing the transmission of engine noise into the cabin of the aircraft.

20 Claims, 5 Drawing Sheets

ENGINE MOUNTING ASSEMBLY

FIELD OF THE INVENTION

The present invention relates to vibration isolators, and more particularly, the present invention relates to vibration isolating mounts of the type particularly suited for supporting aircraft engines.

BACKGROUND OF THE INVENTION

In certain types of jet aircraft, turbine engines are mounted to structures suspended from the aircraft wings. Generally, so-called rigid mounting bracket assemblies which do not isolate vibration have been used because space was not available for either a flexible isolator design or for the engine motion which it allowed. A feasible vibration isolating engine mount is frequently required to support lateral and vertical loads from engines weighing 10,000 pounds or more, with take-off thrust of the order of 60,000 pounds. Spring rates in the lateral and vertical directions must meet values required by dynamic vibration analyses within ±15%. Engine motion must not exceed limits such as ±0.20 inches, even under loads as high as 35,000 pounds, without failure. When only one front and one rear mount are used in conjunction with the thrust links, the rear mount may be required to provide a roll spring rate of 10,000,000 inch pounds per radian, yet still have lateral and vertical spring rates of only 70,000 pounds per inch. Typically, all of this must fit within a space envelope 11" × 16" × 5" high. In addition to meeting these requirements, the mounting brackets must accommodate severe operating conditions, including high temperatures and vibrations.

Various structures have been proposed for mounting turbine engines to aircraft. Examples of such structures may be found in the following U.S. Pat. Nos.: 3,288,404; 3,368,270; 3,727,862; 3,831,888; 4,013,246; 4,022,018; 4,437,627; 4,603,821; and 4,603,822.

U.S. Pat. No. 3,288,404, issued to Schmidt and owned by the assignee of the present application, discloses a turbine engine mounting system which is used on a helicopter. The mounting system includes a torque tube supported in an elastomeric bearing and having arms extending therefrom for connection to an engine bracket.

U.S. Pat. No. 4,805,851, issued to Herbst, and owned by the assignee of the present application, discloses a turbine engine mounting system which is particularly suited for mounting turbine engines to struts suspended from the wings of jet aircraft. In this patented system, a pair of arms are connected by a torque tube which is embraced by an elastomeric bearing of a particular configuration that permits the arms to pivot about the axis of the torque tube but restricts independent pivoting to a minimum. In this way, the torque tube provides roll stiffness, i.e. reactivity to torquing of the engine about its longitudinal axis, and reactivity to torque due to lateral gusts and side loads, while supporting lateral and vertical engine loads with relatively lower spring rates. A particularly desirable feature of the Herbst mount is its ability to limit the transmission of engine vibration noise to the cabin of the aircraft.

While the aforementioned Herbst engine mount functions satisfactorily for its intended purpose, there are aircraft engine mounting applications which require an even larger roll stiffness, greater vibration attenuation, and longer life as well as vertical and lateral load support for engines of higher thrust than those with which the Herbst mount currently finds utility. The present invention provides an engine mounting assembly which meets these requirements.

OBJECTS OF THE INVENTION

With the foregoing in mind, a primary object of the present invention is to provide a heavy duty mount which is particularly suited for use in applications which require that a variety of static and dynamic loading and motion conditions be accommodated while minimizing the transmission of noise across the mount.

Another object of the present invention is to provide a novel aircraft engine mounting assembly which provides the required load support, which is particularly suitable for heavy duty applications.

A further object of the present invention is to provide for an aircraft turbine engine, a mount which has spring rates capable of reducing very undesirable first order engine vibrations and attenuating high frequency vibration, which together, cause noise in the aircraft cabin.

Still another object of the present invention is to provide an improved turbine engine mounting bracket assembly which provides enhanced stiffness to engine roll while supporting lateral and vertical loads with minimal vibration and noise transmission to the cabin of the aircraft.

A further object of the present invention is to provide a unique, durable and readily manufacturable bracket assembly for mounting a high-thrust turbine engine below the wing of an aircraft while minimizing transmission of noise to the aircraft cabin.

SUMMARY OF THE INVENTION

More specifically, the present invention provides a heavy duty mounting assembly particularly suited for isolating noise vibrations between two spaced structures, such as between the cabin of an aircraft and a high-thrust turbine engine. The mounting assembly includes a mounting base which is adapted to be carried by the aircraft and an engine attachment bracket assembly connecting the engine to the mounting base. The attachment bracket assembly includes a pair of arms extending fore and aft of the aircraft and a torque tube and a tie brace interconnecting the arms to form an open rectangular frame. The torque tube is embraced by an elastomeric bearing assembly which pivotally connects it to the base. The tie brace is connected to a vibration isolator pad which is connected to the base by a support cap. The engine is connected to the arms at a location intermediate the torque tube and the tie brace so that vertical loading is shared between the pad an elastomeric bearing. The torque tube provides a desirable very high level of torsional stiffness between the arms to react engine roll while the vibration isolator pad and torque tube elastomeric bearing assemblies provide desirable, low vertical and lateral spring rates. Lateral displacement of the frame relative to the base, and pivotal motion of the frame arms, is accommodated by the vibration isolator pad, by the torque tube elastomeric bearing assembly, and by lateral elastomeric bearing pads interposed at spaced locations between depending outer flanges on the base and the sides of the frame arms. The mounting bracket assembly is particularly suited for suspending high-thrust turbine engines below wings while minimizing engine noise transmission to the interior of the aircraft cabin.

BRIEF DESCRIPTION OF THE DRAWINGS

The foregoing and other objects, features and advantages of the present invention should become apparent from the following description when taken in conjunction with the accompanying drawings, in which.

DESCRIPTION OF THE PREFERRED EMBODIMENT

Figure 1:
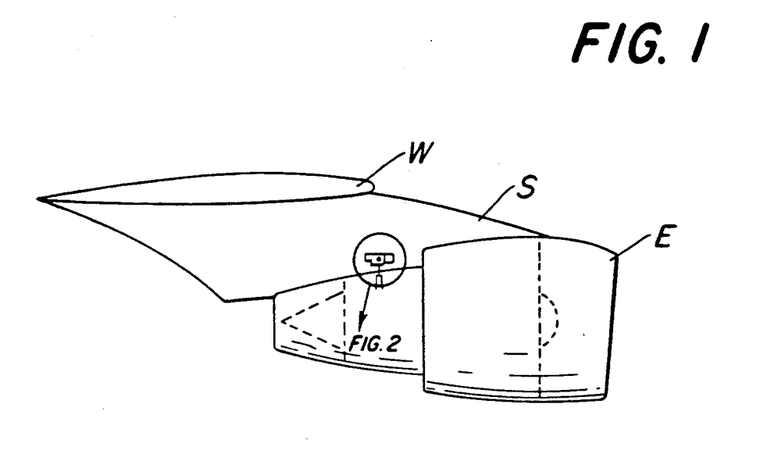
FIG. 1 is a somewhat schematic side elevational view illustrating in full lines a turbine engine carried below and forward of the leading edge of a wing of an aircraft by an aft mounting bracket assembly which embodies the present invention.

Referring now to the drawings, FIG. 1 illustrates somewhat schematically an aircraft turbine engine (E) suspended from an engine strut (S) located below an aircraft wing (W). The engine E is normally fastened to the wing structures by fore and aft engine mounting assemblies. The present invention is concerned with the aft engine mounting assembly schematically indicated within the encircled area of FIG. 1 which is denominated FIG. 2.

Figure 2:
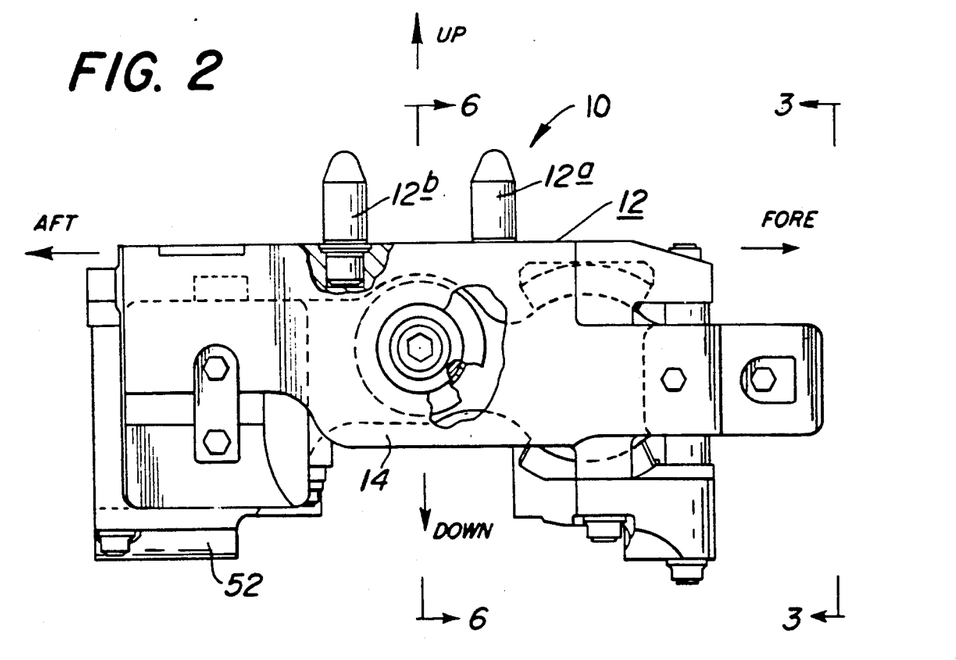
FIG. 2 is a side elevational view of the aft mounting bracket assembly attachment region indicated in FIG. 1, the view having portions partially broken away and sectioned to illustrate certain details of construction.

As illustrated in FIG. 2, the engine mounting assembly 10 of the present invention is shown separate from the engine strut S and the engine E. The mounting assembly 10 includes a base 12 which is adapted to be fastened against the bottom surface of a suitably-shaped structural member carried on the bottom of the engine strut structure S. A pair of alignment pins 12a, 12b project upwardly from the base 12 to facilitate alignment of the base 12 during installation. The base 12 is connected to the engine strut S by high strength bolts (not shown).

Figure 7:
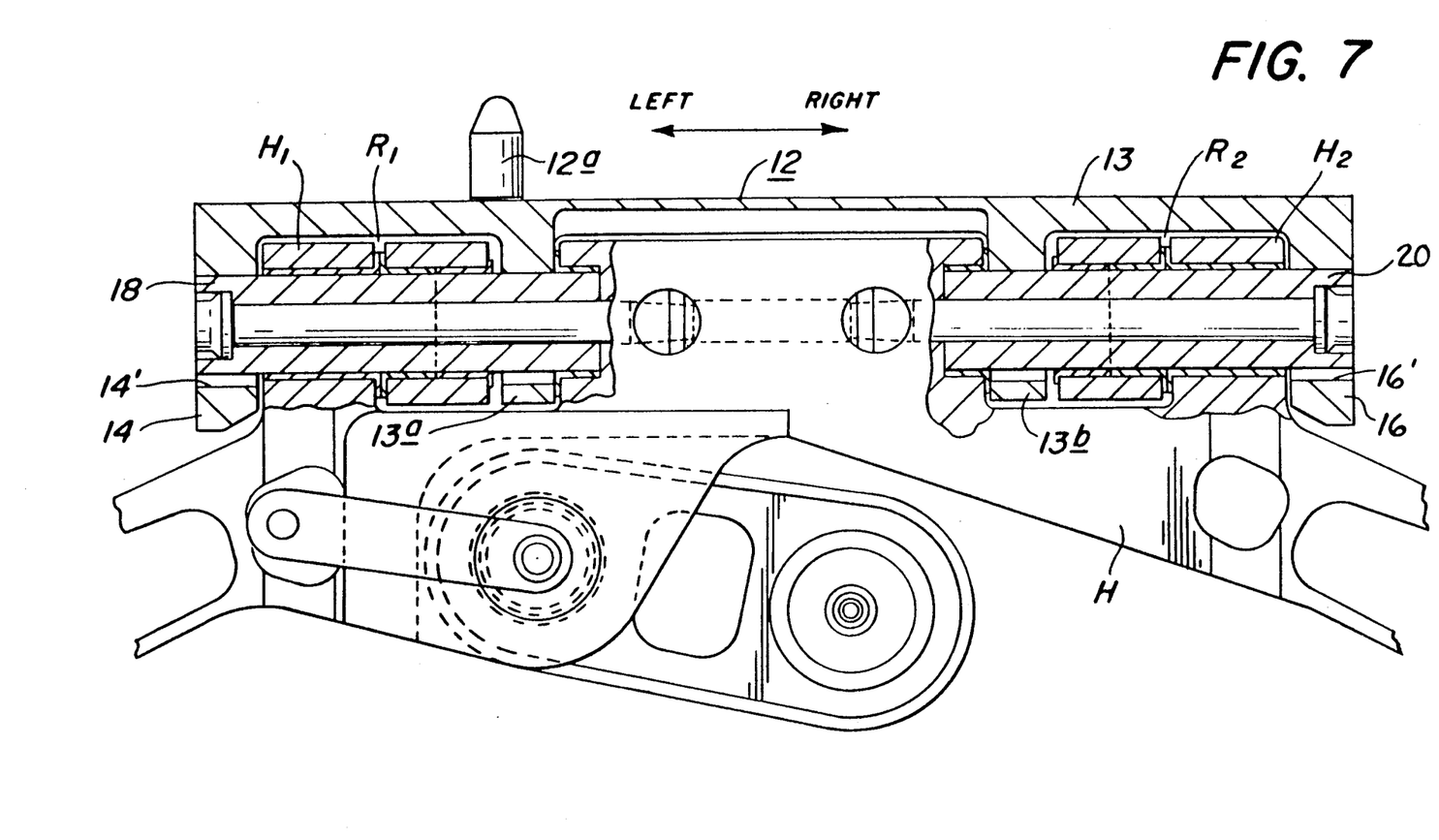
FIG. 7 is an enlarged, partially-sectioned, transverse sectional view illustrating the manner in which the engine mounting assembly of the present invention is connected to a turbine engine hanger.

In the disclosed embodiment, the mounting assembly 10 is mounted to the aircraft in the manner illustrated in FIG. 2 with the forward direction of movement of the aircraft being indicated by the arrow denominated "fore" and the opposite, or rearward, direction being denominated by the arrow indicated "aft". As used herein, the terms "lateral" and "transverse" refer to directions perpendicular to the plane of the sheet of FIG. 2. The term "vertical" is indicated by the arrows denominated "up" and "down" running the lengthwise direction of the sheet containing FIGS. 1 and 2. With reference to FIG. 7, the lateral direction is indicated by the arrows. The fore direction is perpendicular to the plane of FIG. 7, away from the viewer. In other words, FIG. 7 is a view looking forward in FIG. 1.

As best seen in FIG. 7, the mounting assembly base means 12 is mounted intermediate the aircraft engine mounting structure S and the aircraft engine hanger (H). The hanger H has upstanding left and right lugs $H_1$, $H_2$, respectively which project upwardly into recesses $R_1$, $R_2$ respectively in the base 12. The recesses $R_1$, $R_2$ are located inward of a pair of left and right depending flanges 14 and 16, respectively, extending along opposite sides of the base 12. The hanger lugs $H_1$, $H_2$ are fastened to the mounting assembly 10 by means of transverse pin assemblies 18, 20, respectively in a manner to be described.

The configuration of the base 12 may best be seen by reference to FIG. 5 which is an exploded perspective view looking upward toward the mounting assembly 10 as it is installed below a aircraft wing but with connecting bolts removed for purposes of clarity and with an engine attachment bracket assembly 22 displaced downwardly so that interior details of the base 12 may be viewed more readily. The base 12 includes a main generally horizontally-disposed planar plate-like portion 13 from which downturned flange means 14 and 16 depend along left and right sides respectively. The flange means, such as the left flange 14, has fore and aft surfaces 14a, 14b which confront similarly located surfaces 16a, 16b on its companion right flange 16. In the embodiment illustrated, the forward flanges 14a, 16a are spaced apart further from one another than the rearward surfaces 14b, 16b, respectively, although they need not be if spatial conditions permit.

A pair of lugs 13a, 13b depend from the main portion 13 of the base means 12 in spaced parallel relation inward of the flanges 14 and 16, respectively. The lugs 13a, 13b have transverse aligned through bores which are in registry with through bores 14', 16' in the left and right flanges 14 and 16, respectively. The lugs 13a, 13b and bored flanges 14 and 16 function, as will be described, to provide a motion limiting load path for accepting overloads of other components of the mounting assembly 10.

Various vertically-disposed holes are provided in the base 12 for receiving bolts (not shown) to enable the base 12 to be connected to the aircraft engine mounting strut S in a conventional manner. The various connecting bolts have been omitted from FIG. 5 for clarity. Preferably, the entire base 12, including the flanges 14 and 16, and the lugs 13a, 13b, is of monolithic construction, being machined from a one piece block of high-strength metal, such as Type 15-5 PH stainless steel.

Figure 3:
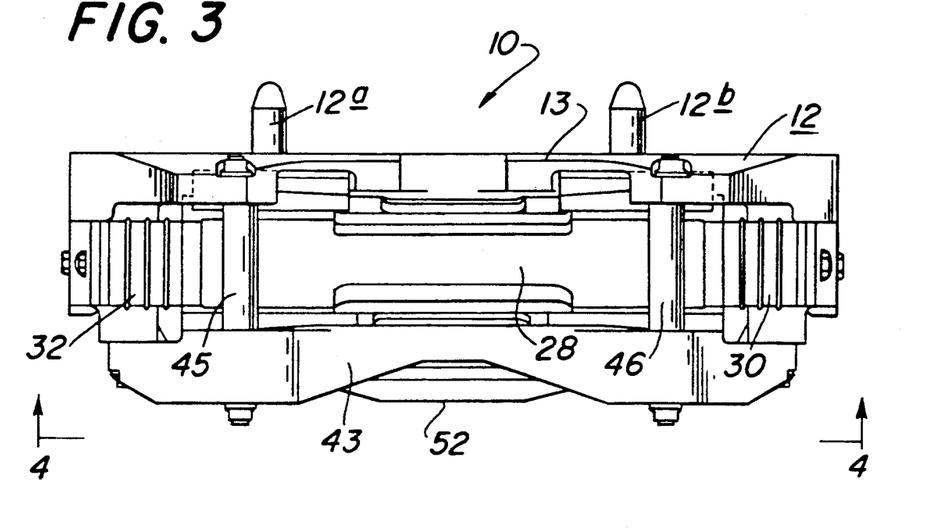
FIG. 3 is a front elevational view taken on line 3—3 of FIG. 2, the view looking rearward, or aft, relative to the direction of motion of the aircraft.
Figure 4:
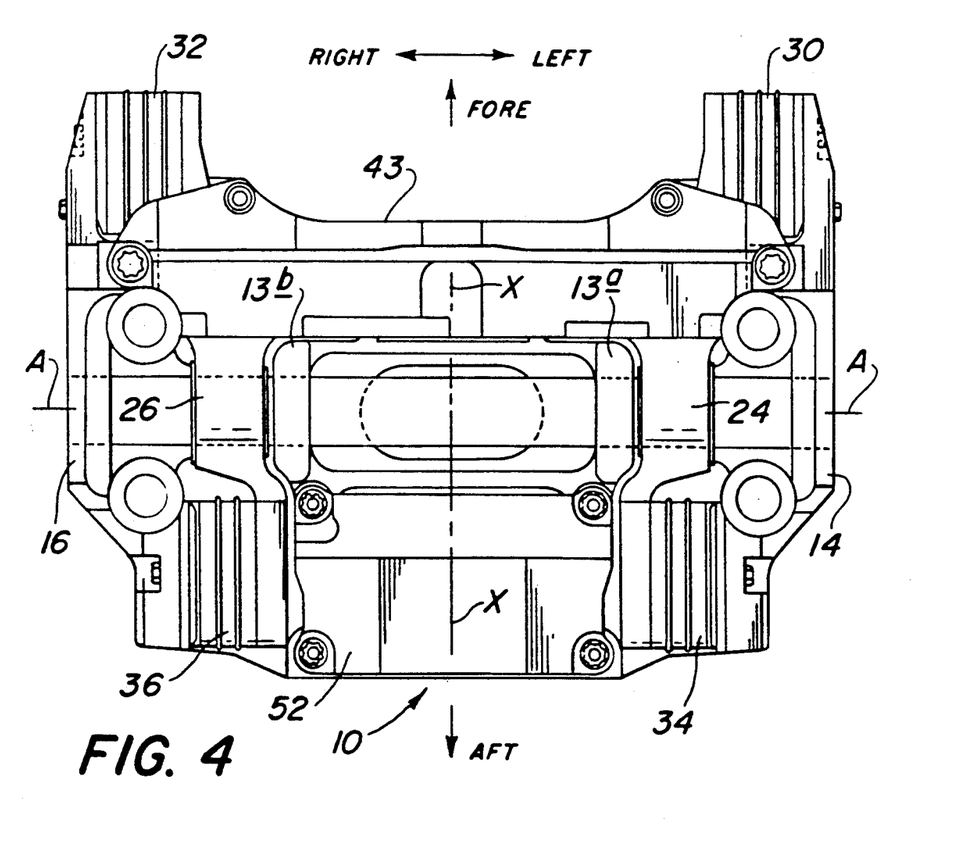
FIG. 4 is a plan view taken on line 4—4 of FIG. 3, the view looking upward at the engine mounting bracket assembly from below when installed on an aircraft.

For the purpose of connecting the engine hanger H to the mounting base 12, the engine attachment bracket assembly 22 is provided. As best seen in FIG. 5, the engine attachment bracket assembly 22 fits within the confines of the base flanges 14 and 16 and is disposed closely adjacent the underside of the main plate portion 13 of the base 12. When thus assembled, the engine attachment bracket assembly 22 cooperates with the base 12 to provide a relatively low profile, compact mount configuration such as illustrated in FIG. 3. As best seen in FIG. 4, which is a view looking upward in FIG. 3 and in FIG. 7, the engine hanger lugs $H_1$, $H_2$ are disposed laterally inward alongside the depending flanges 14 and 16 and laterally outward of the lugs 13a, 13b.

Figure 5:
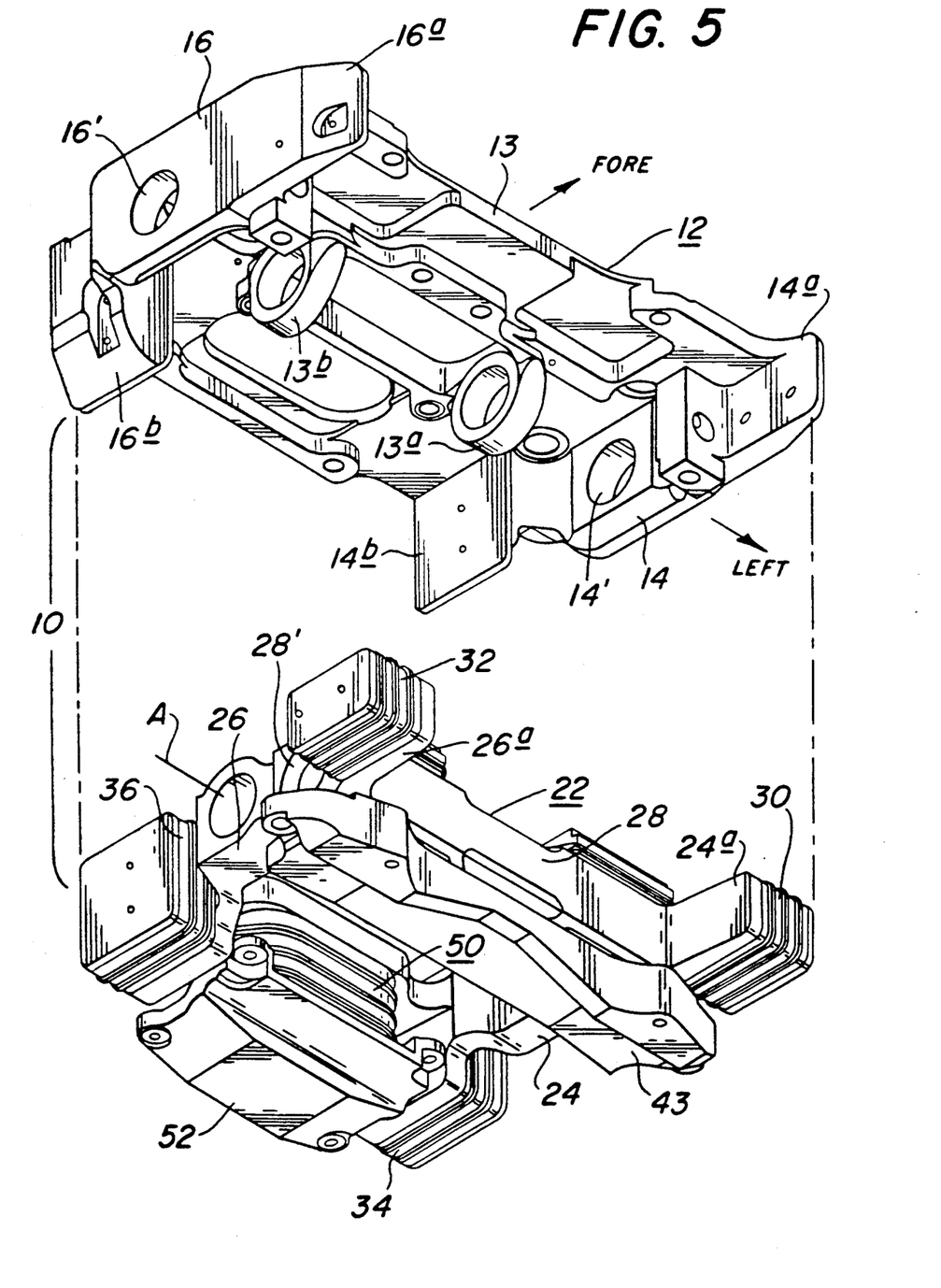
FIG. 5 is an exploded perspective view of the engine mounting bracket assembly of the present invention.
Figure 6:
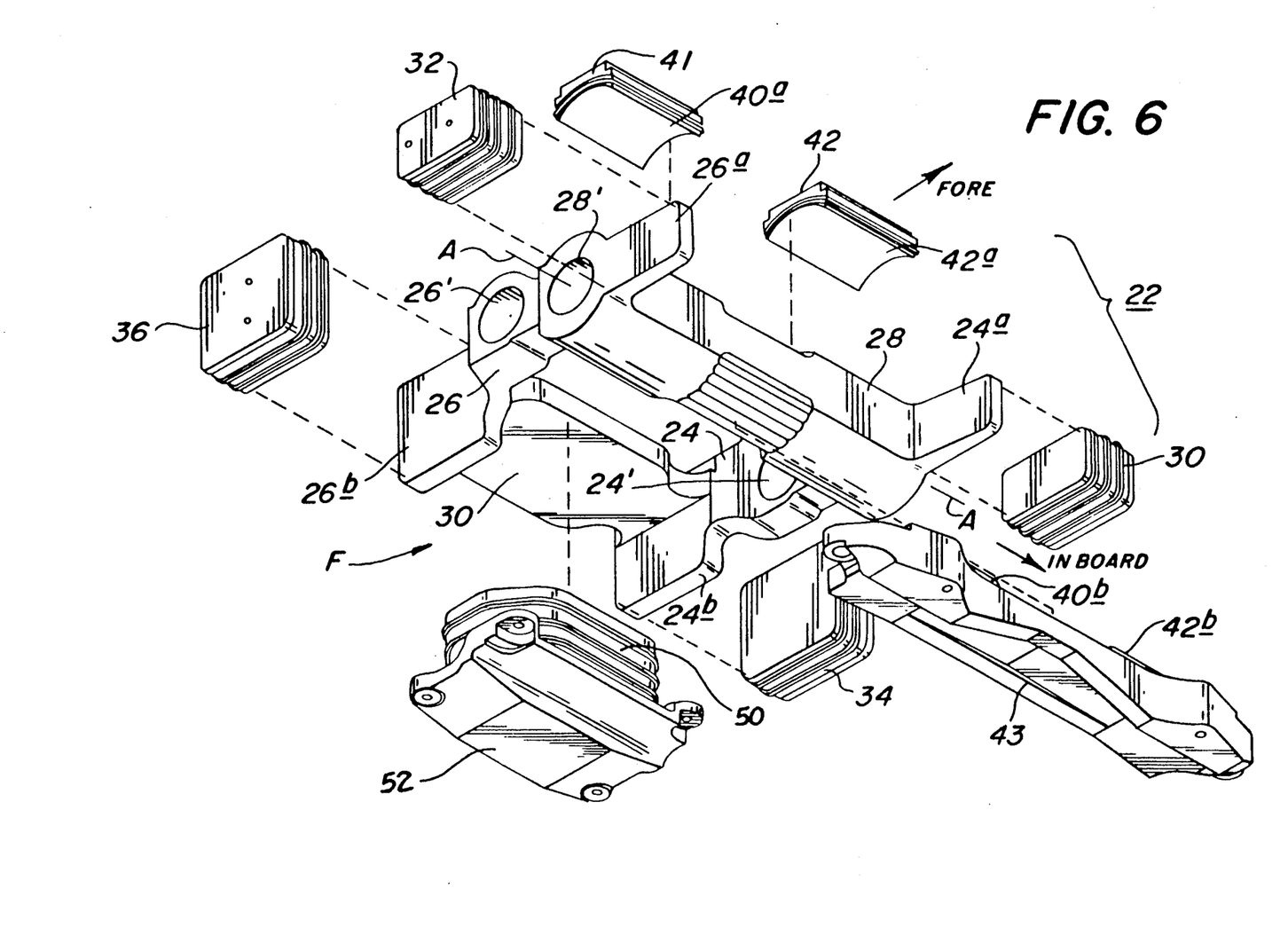
FIG. 6 is an exploded perspective view of the lower portion of the assembly illustrated in FIG. 5.

The engine attachment bracket assembly indicated generally at 22 in FIG. 5 comprises several components. As best seen in FIG. 6, the attachment bracket assembly 22 includes a pair of arms 24 and 26 extending in spaced parallel relation in the fore-aft direction of the aircraft. The arms 24, 26 are torsionally interconnected at a first location by means of a torque tube 28 having a bore 28' extending along its longitudinal axis A—A. In the present instance, the first defined location is located forward of the engine hanger, but there may be installations in which it may be desirable for the location of the torque tube 28 to be aft.

The arms 24 and 26 are interconnected at an aft location by means of a tie brace 30 extending between the arms along their upper edges. The tie brace 30 is stiff, but slightly flexible, to interconnect the arms in a manner that permits a slight amount of relative pivotal motion about the torque tube axis A—A. The arms 24 and 26 have forward extensions 24a, 26a, respectively, and the arms 24 and 26 are offset inwardly toward one another aft of the torque tube 28. Thus, the arms 24 and 26 cooperate with the torque tube 28 and the tie brace 30 to form an open, generally rectangular frame F (FIG. 6) which is disposed in substantially parallel relation with the base plate 13 (FIG. 7). The arms 24 and 26 are provided with through bores 24', 26' which are aligned with corresponding bores in the engine hanger lugs $H_1$, $H_2$. The bores 14', 16' in the flanges 14 and 16 and in the lugs 13a and 13b are enlarged to provide a vertical clearance permitting the lugs $H_1$, $H_2$ to move vertically through limited distances in the recesses $R_1$, $R_2$ when the arms 24 and 26 are connected to the engine hanger lugs $H_1$, $H_2$ by the pin assemblies 18 and 20.

For the purpose of mounting the frame F to the base 12 in a manner permitting the frame arms 24 and 26 to pivot about the torque tube axis A—A of the torque tube 28, elastomeric bearing means is provided. As best seen in FIG. 6, the elastomeric bearing means includes a pair of upper arcuate laminated elastomeric bearing portions 40a, 42a embracing the upper side of the torque tube 28 and a diametrically opposite complementary pair of laminated elastomeric bearing portions 40b, 42b embracing the underside of the torque tube 28. The upper pair of elastomeric bearing portions 40a and 42a have elongate bosses 41, 42, respectively which are received in appropriately shaped recesses in the base plate 13. The lower pair of bearing portions 40b, 42b are similarly shaped and received by an elongate retainer 43 which extends lengthwise below the torque tube 28. Each of the bearing portions may include alternating layers of elastomeric material bonded to and between arcuate shims. The retainer 43 is fastened to the base plate 13, by fasteners, such as the pair of fasteners 45 and 46 illustrated in FIG. 3. Preferably, the fasteners 45 and 46 cooperate with spacers which are suitably dimensioned to precompress the elastomeric bearings 40a, 42a, and 40b, 42b in accordance with customary practice. Desirably, the elastomeric bearing portions are bonded to the torque tube 28 on their diametrically opposite sides so as to carry load in shear without sliding. Thus, the torque tube elastomeric bearings permit the arms 24 and 26 to pivot about the axis A—A as the engine E moves vertically when the arms 24 and 26 are connected to the engine hanger lugs $H_1$, $H_2$, respectively.

The arms 24 and 26 are tied together by both the torque tube 28 and the tie brace 30 so that they move substantially in unison with one another as they pivot about the torque tube axis A—A. Some limited amount of independent arm deflection relative to one another is, however, accommodated by flexure of the tie brace 30.

It is for this purpose that the tie brace 30 is relatively thin in the vertical direction.

To allow arm motion required for achieving a specified vertical spring rate, and to provide additional support for the frame F, a vibration isolator means 50 is provided. As best seen in the embodiment illustrated in FIG. 6, the vibration isolator means 50 includes a main laminated elastomeric bearing pad assembly which engages the underside of the tie brace 30 and which is supported by an underlying support cap 52. The support cap 52 is secured to the plate portion 13 of the base 12 by a plurality of mounting studded spacers (not shown).

In the present instance, the engine hanger lugs $H_1$, $H_2$ are attached to the arms 24, 26 at a location which is closer to the pivot axis A—A of the torque tube 28 than the vibration isolator pad assembly 50 although this need not occur in all applications. The unequal distances between the attachment points and the fore and aft frame bearings provide a desirable leverage action. Thus, for instance, one portion of the load carried by the frame F is transferred to the base 12 by the isolator pad 50, and another portion of the load carried by the frame F is transferred by the torque tube elastomeric bearings described heretofore. The load is thereby shared.

The relative loading of the front and rear elastomeric assemblies provides a number of advantages. For instance, by locating the point of engine attachment between the pivot bearings and the isolator pad 50, the heavy vertical load from the engine weight is divided between these elastomeric elements, allowing all of them to be smaller in size. In previous designs, vertical load is reacted by a cocking loading of elastomer pads bonded to a shaped torque tube. In the present invention, cocking loading is eliminated. Instead, radial loads are applied to elastomeric pivot bearings, and nearly uniform, more efficient, compression loads are applied to the isolator pad. The elastomeric bearings are designed to be very stiff radially so as to be able to carry their share of vertical load without over strain. The isolator pad can be made relatively large in length and width for low compression stress, and thick for low compression strains, without compromising spring rate. The low compression stress also allows the use of a soft (low modulus) elastomer, which provides lower set and drift, less hysteresis damping, and a lower dynamic-to-static stiffness ratio. The result is increased service life, better vibration isolation, and less engine motion than other concepts having the same dynamic spring rates could provide.

While relatively soft elastomers may be utilized in the pad 50, alternating with layers of inelastic material, such as the horizontally-disposed metal shims, the vibration isolator pad 50 may incorporate a fluid isolator which can be designed to either actively or passively provide further improved vibration isolation within a predetermined range of engine operating frequencies. Such an isolator may be designed, for example, to provide vibration and noise attenuation while the engine is operating at cruise power settings to minimize noise in the aircraft. The particular manner by which the desired vibrator isolation can be achieved is well known to designers of fluid mounts. Fluid mounts provide the advantage of enabling higher vertical and lateral static spring rates to be achieved without compromising isolation at desired operating frequencies.

In order to control lateral motion of the frame F relative to the base 12, while permitting the aforedescribed motions of the arms 24 and 26, lateral auxiliary elastomeric pad means are provided between the frame arms and the depending base flanges 14 and 16. As best seen in FIG. 6, the lateral auxiliary pad means includes a pair of pads 30 and 32 engaging the arm extensions 24a and 26a forward of the torque tube 28 and a pair of pads 34 and 36 engaging the arm surfaces 24b and 26b adjacent the tie brace 30. Preferably the pads 30, 32, 34 and 36 are provided by laminated elastomeric bearings composed of alternating layers of elastic and inelastic materials, such layers of elastomeric material bonded to and between flat metal shims. These elastomeric bearing pads are arranged with the metal shims disposed vertically, i.e., parallel with the arm surfaces 24b and 26b and forward arm extensions 24a and 26a and perpendicular to the torque to be pivot axis A—A. As a result, the pads 30, 32, 34 and 36 are stiff in compression to control lateral motion but yieldable in shear to accommodate the required arm motions.

Fluid mounts could also be substituted for the lateral auxiliary elastomeric bearing assemblies 30, 32, 34 and 36 to provide the aforedescribed advantages of fluid mounts in the lateral direction. Regardless of which type of lateral pad is utilized, however, it is desirable for the lateral pads 30, 32, 34 and 36 to be so located relative to the hanger lug attachment points such as to maintain the lateral elastic center of the assembly at the attachment points to reduce any lateral cocking tendency of the frame F relative to the base 12.

In operation, downward static loads imparted to the arms 24 and 26 via the engine hanger lugs $H_1$, $H_2$ are reacted by the elastomeric forward bearing and aft pad assemblies 40, 42 and 50 in accordance with the aforedescribed load sharing relation. Vertical loading on the arms 24 and 26, caused either by steady engine weight or thrust, or by dynamic downward motion of the engine E, as on landing, or sudden upward motion, as upon encountering a downdraft, causes the arms 24 and 26 to pivot in unison about the torque tube axis A—A. Counterclockwise arm motion about the pivot bearing axis A—A (FIG. 6) causes the tie brace 30 to compress the isolator pad 50, and motion in the opposite direction relieves such compression. Extreme up or down excursion of the arms 24 and 26 is arrested, however, by engagement of the pins 18 and 20 with the bores in the lugs 13a, 13b, 14; 16. Since lateral pads 30, 32, 34 and 36, are arranged with their inelastic shims disposed vertically, they undergo shearing, thereby permitting the arms 24 and 26 to pivot with minimal constraint from the pads, permitting pad 50 to support most of the down load at that location. When reacting engine roll moment about the longitudinal axis of the engine E, the arms 24 and 26 are loaded vertically opposite one another, thereby imposing load downward on one bearing, upward on the other, and a torque about the X—X axis of the torque tube. Opposite motions of the arms 24 and 26 which are permitted by torque tube twist, is prevented from overstressing the tie brace 30 by virtue of its thinness in the vertical direction. For vertical engine motion with arms 24 and 26 moving in unison, the torsional motion of the torque tube 28 is accommodated by its associated axially-spaced elastomeric bearings due to the ability of the elastomeric layers of the bearings to undergo shearing among the inelastic layers thereof.

By way of example, and not by way of limitation, the elastomers composing the various elastomeric bearings should be heat resistant. A preferred elastomer is type SPE®V manufactured by Lord Corporation of Erie, PA, the assignee of the present invention. The elastomeric elements used in the pivot bearings may have, and preferably have, a radial spring rate which is about 100 times as stiff as the isolator compression pad 50, but contribute less than 1% of the vertical spring rate at the hanger attachment. Other desirable characteristics of the elastomers include: a metallic discontinuity (low modulus) connection between engine and airframe for high frequency noise attenuation, and a very gradual change in spring rate after the onset of elastomer fatigue that allows visual "on-condition" replacement criteria. For a typical aft engine mounting load requirement of 10,000 (lbs) a combined vertical spring rate of 70,000 lb/in measured at the hanger attachment is desirable, 10% contributed by the forward pads and bearings, and 90% from the aft pad. Combined lateral spring rates of 70,000 lb/in, divided 30% fore and 70% aft are also desirable. Loss factors (tan delta) in a range of 0.05 to 0.30 are desirable for the chosen elastomers.

In view of the foregoing, it should be apparent that the present invention now provides a turbine engine mounting assembly which is well suited for heavy duty applications and for applications requiring improved lateral and vertical vibration isolation without as much allowed engine motion than available with known mounts. Since the mounting bracket assembly utilizes known materials and state of the art manufacturing techniques, it can be designed to meet a variety of operational requirements, yet can be assembled in a straightforward manner and refurbished readily, if necessary.

In the disclosed embodiment, the engine strut below the wing W provides one structure and the engine hanger lugs another structure which are interconnected by means of the mounting assembly of the present invention. There may, however, be other applications in which the disclosed embodiment may find utility such as in various types of systems involving the mounting of vibratory prime movers to various types of supports. An important aspect of the disclosed embodiment is the interposition of elastomeric materials in the load path between the engine structure and its support structure to provide vibration isolation.

In the disclosed embodiment, the arms extend in parallel relation from the torque tube, but in some applications they may converge or diverge. The ends of the arms can be interconnected by tie means, other than the metal tie brace shown, provided the requisite function is realized. The frame also need not in all instances be pivotally supported by the torque tube bearings, but could be supported pivotally at a location separated from the torque tube axis. The torque tube is, however, required. While the hanger lugs connect to the arms between the torque tube and main isolator pad, there may be applications where the arms could be extended fore or aft of either the torque tube and the main isolator pad and attachment made to the arm extensions. Accordingly, while the embodiment disclosed is the best mode contemplated by the applicants at this time, it is not to be regarded as limiting.

Thus, while a preferred embodiment of the present invention has been described in detail, various modifications, alterations and changes may be made without departing from the spirit and scope of the invention as defined in the appended claims.

We claim:

1. A mounting assembly for use in connecting and isolating vibrations between two spaced apart structures, comprising:
 a pair of arms disposed in spaced relation alongside one another between said structures,
 means for providing a torsional connection between said arms to restrain motion relative to one another about an axis extending transverse to the arms at a first location,
 means for mounting said arms to one of said structures in a manner permitting the arms to pivot about said axis either in unison or independently of one another,
 means for connecting said arms to the other of said structures at a second location spaced from said axis, and
 means providing a main vibration isolation connection between said arms and said one of said structures at a third location spaced from said pivot axis,
 whereby the structures are connected together in a manner that minimizes the transmission of vibrations between them.

2. A mounting assembly according to claim 1 including flange means on said one of said structures extending alongside at least portions of said arms, and auxiliary vibration isolation means disposed between said arm portions and said flange means for restraining motion of said arms along said pivot axis while accommodating said pivotal motion of said arms about said pivot axis.

3. A mounting assembly according to claim 2 where said auxiliary vibration isolation means is disposed so that its elastic center extends through said second location.

4. A mounting assembly according to claim 3 wherein said flange means extends in spaced parallel relation along opposite sides of said arms, and said auxiliary vibration isolation means includes a pair of resilient pads disposed between each arm and its adjacent flange means.

5. A mounting assembly according to claim 1 wherein said means providing said main vibration isolation connection includes means for resiliently connecting said arms to said one of said structures in a manner restraining substantial relative movement both between the arms and between the arms and said one structure at said third location.

6. A mounting assembly according to claim 5 wherein said means for resiliently connecting said arms includes a tie brace connecting said arms together at said third location, a resilient compression pad assembly engaging said tie brace, and cap means engaging said resilient compression pad for connecting it to said one structure, whereby motion of the arms away from said one structure is reacted in compression by said resilient compression pad.

7. A mounting assembly according to claim 1 wherein said arms, said torsional connection means and said main vibration isolation connection cooperate to form an open frame disposed between said structures, and said means for mounting said arms to said one of said structures includes an elastomeric bearing assembly.

8. A mounting assembly according to claim 7 wherein said one of said structures has flange means extending alongside at least portions said arms, and including auxiliary vibration isolation means engaged between said flange means and said arm portions for restraining lateral motion of said arms while accommodating pivotal motion thereof.

9. A mounting assembly according to claim 1 wherein said arms extend in spaced relation and are interconnected at said first location by a torque tube which provides said torsional connection means; and said means providing said main vibration isolation connection includes a tie brace interconnecting said arms at said third location, a resilient compression pad engaging said tie brace, and cap means connecting said pad to said one of said structures, whereby arm motion is reacted in compression by said resilient pad.

10. A mounting assembly for use in isolating vibrations between spaced apart structures; comprising:
 mounting base means adapted to be secured to one of said structures;
 an attachment bracket assembly disposed between said mounting base means and said one of said structures;
 said attachment bracket assembly including:
  a pair of arms extending in spaced relation alongside said mounting base means,
  means for torsionally connecting said arms together at a first location to restrain relative pivotal motion of said arms about an axis transverse thereto which is identified as a pivot axis,
  means on said arms for connecting them to one of said structures,
  bearing means embracing said attachment bracket assembly for connecting said assembly to said base means, and
  main vibration isolator means for connecting said arms to said base means at a location spaced from said pivot axis and limiting displacement of said arms away from said base means including tie brace means interconnecting said arms together at a second location spaced from said pivot axis, a resilient deformable pad engaging said tie brace means, and cap means for attaching said pad to said base means so that said pad is placed in compression when said arms move away from said base means;
 whereby the mounting assembly can attenuate noises between the structures.

11. A mounting assembly according to claim 10 wherein said torsional connecting means includes a torque tube providing said torsional connection between said arms, and said bearing means includes a laminated elastomeric bearing having opposed bearing portions located on diametrically-opposite sides of said torque tube, each of said bearing portions including alternating arcuate layers of elastic and inelastic material extending along at least portions of said torque tube and radially outward therefrom, and including retainer means for attaching said bearing portions to said base means.

12. A mounting bracket assembly according to claim 10 wherein said arms, said torsional connecting means, and said main vibration isolator means cooperate to form a substantially rectangular open frame in which the arms are connected together predominately in torsion at said first location so that they can pivot in unison and be restrained by said main vibration isolator means.

13. A mounting assembly according to claim 10 wherein said arm means, said torsional and said main vibration isolation means cooperate to define an open rectangular frame disposed alongside said base means.

14. A mounting assembly for use in isolating vibrations between spaced apart structures, comprising:

mounting base means adapted to be secured to one of said structures;

an attachment bracket assembly disposed between said mounting base means and said one of said structures;

said attachment bracket assembly including:

a pair of arms extending in spaced relation alongside said mounting base means, means for torsionally connecting said arms together at a first location to restrain relative pivotal motion of said arms about an axis transverse thereto which is identified as a pivot axis.

means on said arms for connecting them to one of said structures, bearing means embracing said attachment bracket assembly for connecting said assembly to said base means, and main vibration isolator means for connecting said arms to said base means at a location spaced from said pivot axis and limiting displacement of said arms away from said base means;

wherein said pair of arms, and said torsional connecting means and main vibration isolator means cooperate to form a substantially rectangular open frame, said base means has depending laterally spaced flanges on opposite sides of said arms, and includes lateral elastomeric pads engaged between said arms and said flanges for controlling lateral motion of the arms relative to the base means while permitting pivotal motion of the arms relative to said base means;

whereby the mounting assembly can attenuate noises between the structures.

15. For use in combination with an aircraft having a turbine engine carried outboard of the aircraft fuselage below a wing, a mounting assembly for securing the aft end of the engine to the wing and limiting noise transmission to the fuselage, said mounting assembly comprising:

mounting base means adapted to be secured to the aircraft for carrying the engine;

an engine attachment bracket assembly disposed between said mounting base means and the engine;

said attachment bracket assembly including: means providing a substantially rectangular open frame means disposed alongside said mounting base means in substantially parallel relation therewith, said frame means including a pair of engine attachment arms extending in spaced relation, means torsionally connecting said arms together at a first location, means spaced from said torsional connecting means tying said arms together flexurally;

elastomeric bearing means embracing said torsional connecting means for permitting said arms to pivot relative to one another and relative to said base means; and main vibration isolation means engaging said arm tying means and connected to said base means for supporting said arms while enabling them to pivot either alone or together relative to said base means; and auxiliary elastomeric pad means disposed laterally between said frame means and said base means for limiting motion of said frame means laterally alongside said base means;

whereby the mounting assembly can attenuate engine noises transmitted to the aircraft cabin.

16. A mounting bracket assembly according to claim 15 wherein said torsional connecting means includes a torque tube, said elastomeric bearing means includes opposed laminated elastomeric bearings on opposite sides of the torque tube for permitting said torque tube to pivot, said arm means includes bores located between said torque tube and said main vibration isolation means for receiving engine attachments, and said main vibration isolator means includes a laminated elastomeric bearing pad means connecting said arm tying means to said base means.

17. A mounting assembly according to claim 15 wherein said base means has a plate portion and depending flange means located in spaced confronting relation on opposite lateral sides of said frame, and including laminated elastomeric bearing means engaged between said flange means and said opposite lateral sides of said frame for limiting motion of the frame in a lateral direction alongside the base plate means.

18. A mounting assembly according to claim 15 wherein said base means has a plate portion with lugs depending therefrom alongside said arms, said lugs and arms having apertures in registry with one another for receiving engine attachments, the lugs and flange apertures being sized to snub motion of the arms when they move through a predetermined distance relative to the plate portion.

19. A mounting according to claim 15 wherein said auxiliary lateral elastomeric pad means includes a pair of laminated elastomeric bearings disposed on each side of said frame to resist in compression lateral motion of the frame relative to the base means and to accommodate in shear pivotal motion of the arm means relative to the base means.

20. In combination with an aircraft having a turbine engine carried by a wing thereof, a mounting bracket assembly for mounting the engine below the wing, comprising:

an open substantially rectangular frame, said frame having a pair of arms extending longitudinally in parallel fore and aft relation below said wing, said frame having a torque tube for connecting said arms together torsionally, said frame also having a tie brace spaced from said torque tube for flexurally interconnecting said arms, a first laminated elastomeric bearing assembly engaging said torque tube to permit the arms to pivot alone or together about an axis transverse to the longitudinal axis of the aircraft, a second laminated elastomeric bearing assembly engaging said tie brace for restraining pivotal motion of said arms, flange means carried below said wing in laterally spaced confronting relation for providing a recess to receive said frame, and means providing elastomeric bearing pads between said flange means and opposite sides of said frame for permitting said pivotal motion of said arms while restraining lateral motion of said frame, whereby the engine is mounted to the arms in a manner which minimizes the transmission of engine noise to the aircraft fuselage.

* * * * *